(12) United States Patent
Dally et al.

(10) Patent No.: US 6,370,145 B1
(45) Date of Patent: Apr. 9, 2002

(54) INTERNET SWITCH ROUTER

(75) Inventors: William J. Dally, Stanford, CA (US); Philip P. Carvey, Bedford, MA (US); Larry R. Dennison, Norwood, MA (US); P. Allen King, Needham, MA (US)

(73) Assignee: Avici Systems, Chelmsford, MA (US)

( * ) Notice: Subject to any disclaimer, the term of this patent is extended or adjusted under 35 U.S.C. 154(b) by 0 days.

(21) Appl. No.: 08/918,556

(22) Filed: Aug. 22, 1997

(51) Int. Cl.[7] ............................................... H04L 12/56
(52) U.S. Cl. ...................... 370/400; 370/389; 370/392; 370/409
(58) Field of Search ............................... 370/389, 392, 370/351, 352, 386, 400, 401, 409, 422; 711/202

(56) References Cited

U.S. PATENT DOCUMENTS

| | | | |
|---|---|---|---|
| 4,118,094 A | 10/1978 | Key ............................ 439/635 |
| 4,340,092 A | 7/1982 | Chisholm .................... 140/635 |
| 4,371,013 A | 2/1983 | Camp .......................... 140/147 |
| 4,469,388 A | 9/1984 | Narozny ...................... 439/153 |
| 4,631,637 A | 12/1986 | Romania et al. ............. 361/788 |
| 4,861,274 A | 8/1989 | Brune et al. ................. 439/189 |
| 4,911,645 A | 3/1990 | August et al. ................. 439/75 |
| 4,933,933 A | 6/1990 | Dally et al. .................. 370/409 |
| 5,058,001 A | * 10/1991 | Li ........................... 395/500.44 |
| 5,088,091 A | 2/1992 | Schroeder et al. ........... 370/406 |
| 5,123,848 A | 6/1992 | August et al. ................. 439/66 |
| 5,134,690 A | 7/1992 | Samatham ................... 710/317 |
| 5,144,691 A | 9/1992 | August et al. ................. 385/88 |
| 5,155,784 A | 10/1992 | Knott ........................... 385/88 |
| 5,172,371 A | 12/1992 | Eng et al. .................... 370/411 |
| 5,261,827 A | 11/1993 | Lenzi et al. .................... 439/78 |
| 5,355,372 A | 10/1994 | Sengupta et al. ............ 370/367 |
| 5,390,173 A | * 2/1995 | Spinney et al. .............. 370/393 |
| 5,408,469 A | 4/1995 | Opher et al. ................. 370/399 |
| 5,425,169 A | 6/1995 | Steinman et al. .............. 29/758 |
| 5,444,701 A | 8/1995 | Cypher et al. ............... 370/406 |
| 5,521,591 A | 5/1996 | Arora et al. ................. 340/2.21 |
| 5,532,856 A | 7/1996 | Li et al. ...................... 359/118 |
| 5,581,705 A | 12/1996 | Passint et al. ............... 709/200 |
| 5,583,990 A | 12/1996 | Birrittella et al. ............. 712/29 |

(List continued on next page.)

OTHER PUBLICATIONS

Abali, B. et al., "Routing Algorithms for IBM SP1", Parallel Computer Routing and Communication, First Int'l Workshop, PCRCW '94, May 16–18, 1994, pp. 160–175.

(List continued on next page.)

*Primary Examiner*—Hassan Kizou
*Assistant Examiner*—Saba Tsegaye
(74) *Attorney, Agent, or Firm*—Hamilton, Brook, Smith & Reynolds, P.C.

(57) ABSTRACT

An internet router is implemented as a network fabric of fabric routers and links. The internet router receives data packets from trunk lines or other internet links and analyzes header information in the data packets to route the data packets to output internet links. The line interface also analyzes the header to define a fabric path through the router fabric. The internet packets are broken into flits which are transferred through the router according to a wormhole routing protocol. Flits are stored in fabric routers at storage locations assigned to virtual channels corresponding to destination internet links. The virtual channels and links within the fabric define virtual networks in which congestion in one virtual network is substantially nonblocking to data flow through other virtual networks. Arbitration is performed at each fabric router to assign packets to virtual channels and to assign virtual channels to output fabric links. A virtual channel is enabled for possible assignment to an output fabric link upon receipt of an indication that an input buffer is available at the next fabric router of the path.

34 Claims, 9 Drawing Sheets

U.S. PATENT DOCUMENTS

| | | | |
|---|---|---|---|
| 5,617,577 A | | 4/1997 | Barker et al. ................. 712/12 |
| 5,659,716 A | | 8/1997 | Selvidge et al. .............. 703/23 |
| 5,659,796 A | | 8/1997 | Thorson et al. ............. 709/241 |
| 5,732,078 A | * | 3/1998 | Arango ....................... 370/355 |
| 5,841,775 A | * | 11/1998 | Huang ........................ 370/422 |
| 5,894,481 A | * | 4/1999 | Book .......................... 370/412 |
| 5,903,558 A | * | 5/1999 | Jones et al. ................. 370/351 |
| 5,903,559 A | * | 5/1999 | Acharya et al. ............ 370/355 |
| 5,905,723 A | * | 5/1999 | Varghese et al. ........... 370/351 |
| 6,011,795 A | * | 1/2000 | Varghese et al. ........... 370/392 |
| 6,064,653 A | * | 5/2000 | Farris ......................... 370/237 |

OTHER PUBLICATIONS

Scott, S., et al., "Optimized Routing in the Cray T3D", Parallel Computer Routing and Communication, First Int'l Workshop, PCRCW '94, May 16–18, 1994, pp. 280–294.

Parulkar G. et al., "AITPM: A strategy for Integrating IP with ATM," Computer Communications Review, vol. 25, No. 4, Oct. 1, 1995, pp. 49–58.

Robertazzi T., et al., "Deflection Strategies for the Manhattan Street Network," Communications—Rising to the Heights, Denver, Jun. 23–26, 1991, vol. 3, Oct. 23, 1991, pp. 1652–1658, IEEE.

Yang, C.S., et al., "Fault Tolerant Wormhole Routing In Hypercube Multicomputers," Microprocessing and Microprogramming, vol. 35, No. 1/5, Sep. 01, 1992, pp. 667–672.

Stunkel, C.B., et al., "The SP2 High–Performance Switch," IBM Systems Journal, vol. 34, No. 2, 1995, pp. 184–204.

Dally, William J. et al., "the Reliable Router: A Reliable and High–Performance Communication Substrate for Parallel Computers, " Proceedings of Parallel Computer Routing and Communication Workshop, Seattle, WA, May, 1994, pp. 241–255.

Dally, William J. et al., "Architecture and Implementation of the Reliable Router," Proceedings of Hot Interconnects II, Stanford, CA, Aug. 11–13, 1994, pp. 122–133.

Nuth Peter et al., "The J–Machine Network" Proceedings of the International Conference on Computer Design: VLSI in Computers and Processors, Cambridge, MA, Oct. 1992, pp. 420–423.

Dennison, Larry R., "The Reliable Router: An Architecture for Fault Tolerant Interconnect", Ph.D. Thesis, MIT, Cambridge, MA, Jun. 1996, pp. 1–444.

Glass, Christopher J. et al., "The Turn Model for Adapative Routing," Proceedings of the 19th International Symposium on Computer Architecture, May 1992, pp. 278–287.

R. Rettberg et al., "Development of a Voice Funnel Sysytem: Design Report," Report No. 4098, Aug. 1979, 149 pages.

Dally, William, "Network and Processor Architecture for Message–Driven Computers," Chapter 3, *VLSI and Parallel Computation*, Edited by Report Suaya et al., 1900, pp. 140–222.

Dally, William, "Virtual–Channel Flow Control," IEEE Transactions on Parallel and Distributed Systems, Mar. 1992, pp. 194–205.

Dally, William et al., "The Torus Routing Chip," Distributed Computing, (1996) 1: pp. 187–196.

Jesshope, Chris, "The MP1 Chip and its Application" Department of Electronic and Electrical Engineering, University of Surrey, Guildford, Surrey, GU2 5XH, UK pp. 47–57.

Kessler, R.E., et al., "CRAY T3D: A New Dimension for Cray Research," IEEE, 1993, pp. 176–182.

Dally, William, et al., "Deadlock–Free Message Routing in Multiprocessor Interconnection Networks," IEEE Transactions on Computers, vol. C–36, No. 5, May 1987 pp. 547–553.

Jesshope, Chris, et al., "The MP1 Network Chip," IEEE, 1992 pp. 338–348.

\* cited by examiner

INTERNET SWITCH ROUTER

BACKGROUND OF THE INVENTION

Data communication between computer systems for applications such as web browsing, electronic mail, file transfer, and electronic commerce is often performed using a family of protocols known as IP (internet protocol) or sometimes TCP/IP. As applications that use extensive data communication become more popular, the traffic demands on the backbone IP network are increasing exponentially. It is expected that IP routers with several hundred ports operating with aggregate bandwidth of Terabits per second will be needed over the next few years to sustain growth in backbone demand.

As illustrated in FIG. 1, the Internet is arranged as a hierarchy of networks. A typical end-user has a workstation 22 connected to a local-area network or LAN 24. To allow users on the LAN to access the rest of the internet, the LAN is connected via a router R to a regional network 26 that is maintained and operated by a Regional Network Provider or RNP. The connection is often made through an Internet Service Provider or ISP. To access other regions, the regional network connects to the backbone network 28 at a Network Access Point (NAP). The NAPs are usually located only in major cities.

The network is made up of links and routers. In the network backbone, the links are usually fiber optic communication channels operating using the SONET (synchronous optical network) protocol. SONET links operate at a variety of data rates ranging from OC-3 (155 Mb/s) to OC-192 (9.9 Gb/s). These links, sometimes called trunks, move data from one point to another, often over considerable distances.

Routers connect a group of links together and perform two functions: forwarding and routing. A data packet arriving on one link of a router is forwarded by sending it out on a different link depending on its eventual destination and the state of the output links. To compute the output link for a given packet, the router participates in a routing protocol where all of the routers on the Internet exchange information about the connectivity of the network and compute routing tables based on this information.

Most prior art Internet routers are based on a common bus (FIG. 2) or a crossbar switch (FIG. 3). In the bus-based switch of FIG. 2, for example, a given SONET link 30 is connected to a line-interface module 32. This module extracts the packets from the incoming SONET stream. For each incoming packet, the line interface reads the packet header, and using this information, determines the output port (or ports) to which the packet is to be forwarded. To forward the packet, the line interface module arbitrates for the common bus 34. When the bus is granted, the packet is transmitted over the bus to the output line interface module. The module subsequently transits the packet on an outgoing SONET link 30 to the next hop on the route to its destination.

Bus-based routers have limited bandwidth and scalability. The central bus becomes a bottleneck through which all traffic must flow. A very fast bus, for example, operates a 128-bit wide datapath at 50 MHz giving an aggregate bandwidth of 6.4 Gb/s, far short of the Terabits per second needed by a backbone switch. Also, the fan-out limitations of the bus interfaces limit the number of ports on a bus-based switch to typically no more than 32.

The bandwidth limitation of a bus may be overcome by using a crossbar switch as illustrated in FIG. 3. For N line interfaces 36, the switch contains N(N−1) crosspoints, each denoted by a circle. Each line interface can select any of the other line interfaces as its input by connecting the two lines that meet at the appropriate crosspoint 38. To forward a packet with this organization, a line interface arbitrates for the required output line interface. When the request is granted, the appropriate crosspoint is closed and data is transmitted from the input module to the output module. Because the crossbar can simultaneously connect many inputs to many outputs, this organization provides many times the bandwidth of a bus-based switch.

Despite their increased bandwidth, crossbar-based routers still lack the scalability and bandwidth needed for an IP backbone router. The fan-out and fan-in required by the crossbar connection, where every input is connected to every output, limits the number of ports to typically no more than 32. This limited scalability also results in limited bandwidth. For example, a state-of-the-art crossbar might operate 32 32-bit channels simultaneously at 200 MHz giving a peak bandwidth of 200 Gb/s. This is still short of the bandwidth demanded by a backbone IP router.

SUMMARY OF THE INVENTION

While they have limited bandwidth and scalability, crossbar-based routers have two desirable features:

1. They are non-blocking. As long as no two inputs request to communicate with the same output, all inputs can be simultaneously connected to their requested outputs. If one output becomes congested, the traffic to that output does not interfere with traffic addressed to other outputs.
2. They provide stiff backpressure. The direct connection between source and destination over the crossbar usually includes a reverse channel that may be used for immediate flow control. This backpressure can be used, for example, by an overloaded destination to signal a source to stop sending data.

To meet the requirements of routing for the internet backbone we would like to preserve these two properties while providing orders of magnitude greater bandwidth and scalability.

In accordance with the present invention, advantages of crossbar-based internet routers are obtained with greater bandwidth and scalability by implementing the router itself as a multi-hop network.

A router embodying the invention receives data packets from a plurality of internet links and analyzes header information in the data packets to route the data packets to output internet links. The internet router comprises a fabric of fabric links joined by fabric routers, the number of fabric links to each fabric router being substantially less than the number of internet links served by the internet router. The fabric links and fabric routers provide data communication between internet links through one or more hops through the fabric. In one embodiment, for example, 600 internet links are served by a 6×10×10 3-dimensional torus fabric array.

By providing a plurality of buffers in each fabric router, virtual channels which share fabric output links may be defined. The virtual channels and links form a virtual network between internet router inputs and outputs in which congestion in one virtual network is substantially non-blocking to data flow through other virtual networks. A line interface to each internet link analyzes the header information in data packets received from the internet link to identify output internet links through an internet routing protocol. The line interface further determines, through a fabric routing protocol, a routing path through the fabric to the identified output internet link. The packets may be subdivided into segments or flits (flow control digits) at the line interface, and those segments are forwarded through the fabric using wormhole routing. The line interface may define the routing path through the fabric by including, in a header, a link definition of each successive link in the routing path. Each fabric router along the routing path stores an associated link definition from the header for forwarding successive segments of the packet.

Preferably, between hops on fabric links, flits are stored in fabric routers at storage locations assigned to virtual channels which correspond to destination internet links. In one embodiment, the set of destination internet links is partitioned into disjoint subsets, and each virtual channel is assigned exclusively to one subset of destination internet links. In preferred embodiments, the number of internet links served by the internet router is at least an order of magnitude greater than the number of fabric links to each fabric router, and the number of virtual channels per fabric router is substantially greater than the number of links to the fabric router.

To share virtual channels among data packets and to share fabric links among virtual channels, an arbitration is performed at each fabric router to assign a packet to a virtual channel for output from the fabric router and to assign a virtual channel to an output fabric link from the fabric router. For flow control, a virtual channel is enabled for possible assignment to an output fabric link upon receipt of an indication that an input buffer is available at the opposite end of the link.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

In implementing an internet router, the present invention borrows from multiprocessor technology and modifies that technology to meet the unique characteristics and requirements of internet routers. In particular, each internet router is itself configured as either a direct or indirect network.

Figure 1:
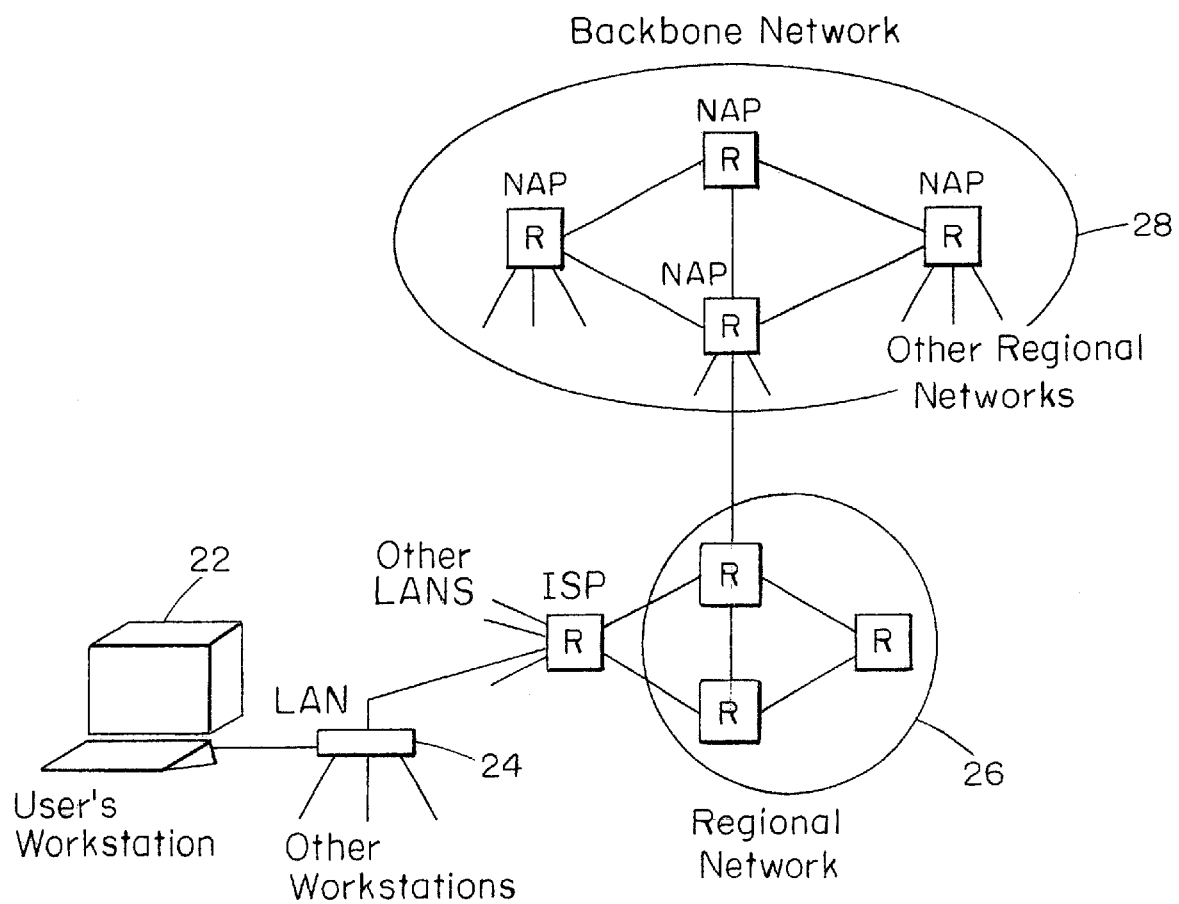
FIG. 1 illustrates an internet configuration of routers to which the present invention may be applied.
Figure 2:
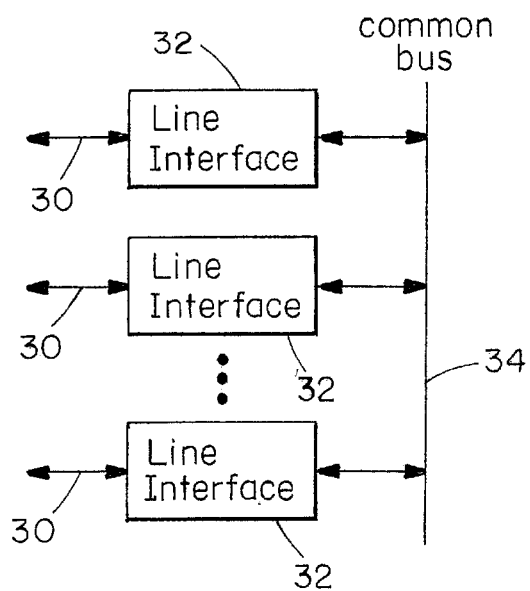
FIG. 2 is a prior art bus-based internet router.
Figure 3:
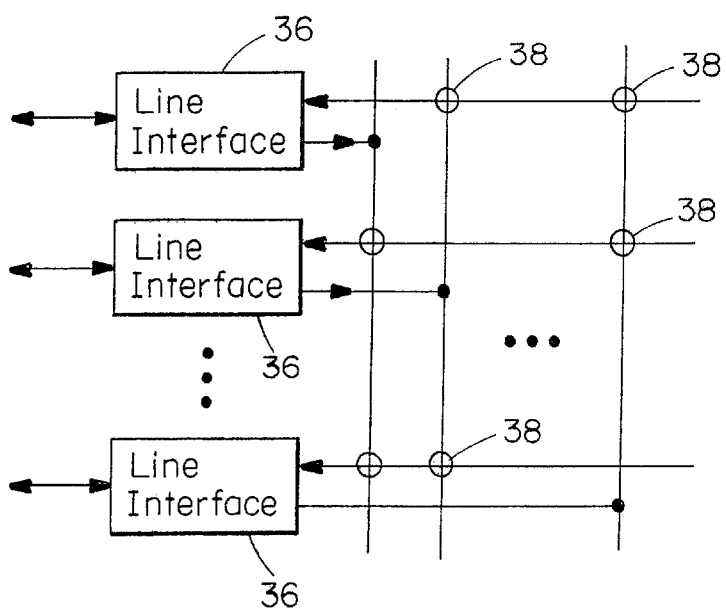
FIG. 3 is a prior art crossbar switch internet router.

Multicomputers and multiprocessors have for many years used direct and indirect interconnection networks to send addresses and data for memory accesses between processors and memory banks or to send messages between processors. Early multicomputers were constructed using the bus and crossbar interconnects shown in FIGS. 2 and 3. However, to permit these machines to scale to larger numbers of processors they switched to the use of direct and indirect interconnection networks.

Figure 4:
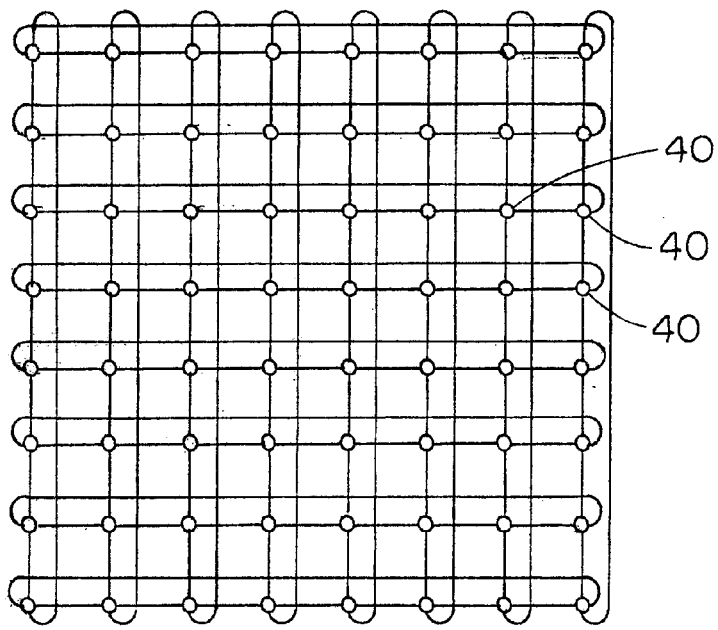
FIG. 4 illustrates a two-dimensional torus array previously used in direct multiprocessor networks.

A direct network, as illustrated in FIG. 4, is comprised of a set of processing nodes 40, each of which includes a router, R, along with a processor, P, and some memory, M. These multicomputer routers should not be confused with the IP routers described above. They perform only forwarding functions and only in the very constrained environment of a multicomputer interconnection network. Each multicomputer router has some number, four in the example, of connections to other routers in the network. A processing node may send a message or make a memory access to any other node in the system. It is not limited to communicating only with the immediately adjacent nodes. Messages to nodes that are further away are forwarded by the routers along the path between the source and destination nodes.

Figure 5:
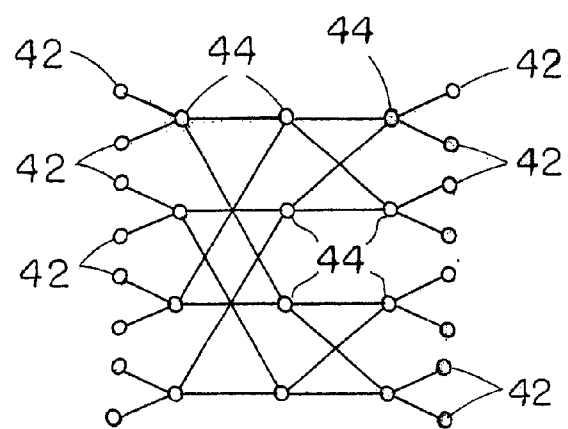
FIG. 5 illustrates an indirect network.

The network shown in FIG. 4 is said to be direct since the channels are made directly between the processing nodes of the system. In contrast, FIG. 5 shows an indirect network in which the connections between process nodes 42 are made indirectly, via a set of router-only switch nodes 44. Direct networks are generally preferred for large machines because of the scalability. While an indirect network is usually built for a fixed number of nodes, a direct network grows with the nodes. As more nodes are added, more network is added as well since a small piece of the network, one router, is included within each node.

Multicomputer networks are described in detail in Dally, W. J., "Network and Processor Architectures for Message-Driven Computing," *VLSI and PARALLEL COMPUTATION*, Edited by Suaya and Birtwistle, Morgan Kaufmann Publishers, Inc., 1990, pp. 140–218. It should be stressed that multicomputer networks are local to a single cabinet or room as opposed to the Internet backbone network which spans the continent.

Direct and indirect multicomputer networks are scalable. For most common topologies the fan-in and fan-out of each node is constant, independent of the size of the machine. Also, the traffic load on each link is either constant or a very slowly increasing function of machine size. Because of this scalability, these networks have been successfully used to construct parallel computers with thousands of processing nodes.

Unfortunately, while multicomputer networks are scalable, they give up the two properties of crossbar networks that were crucial to IP switching: non-blocking behavior and stiff backpressure. Most economical direct and indirect networks are blocking. Because links are shared between multiple source-destination pairs, a busy connection between a pair of nodes can block the establishment of a new connection between a completely separate pair of nodes. Because packets in multicomputer networks are forwarded over multiple links with considerable queuing at each link, the backpressure, if any, from an overloaded destination node to a transmitting source node is late and soft if present at all.

The blocking nature of these switches and the soft nature of this backpressure is not a problem for a multicomputer because multicomputer traffic is self-throttling. After a processor has sent a small number of messages or memory requests (typically 1–8), it cannot send any further messages until it receives one or more replies. Thus, when the network slows down because of blocking or congestion, the traffic offered to the network is automatically reduced as the processors stall awaiting replies.

An IP switch, on the other hand, is not self-throttling. If some channels in the network become blocked or congested, the offered traffic is not reduced. Packets continue to arrive over the input links to the switch regardless of the state of the network. Because of this, an IP switch or router built from an unmodified multicomputer network is likely to become tree-saturated, and deny service to many nodes not involved in the original blockage. Moreover transient conditions often exist in IP routers where, due to an error in computing routing tables, a single output node can be overloaded for a sustained period of time. This causes no problems with a crossbar router as other nodes are unaffected. With a multicomputer network, however, this causes tree saturation.

Figure 6:
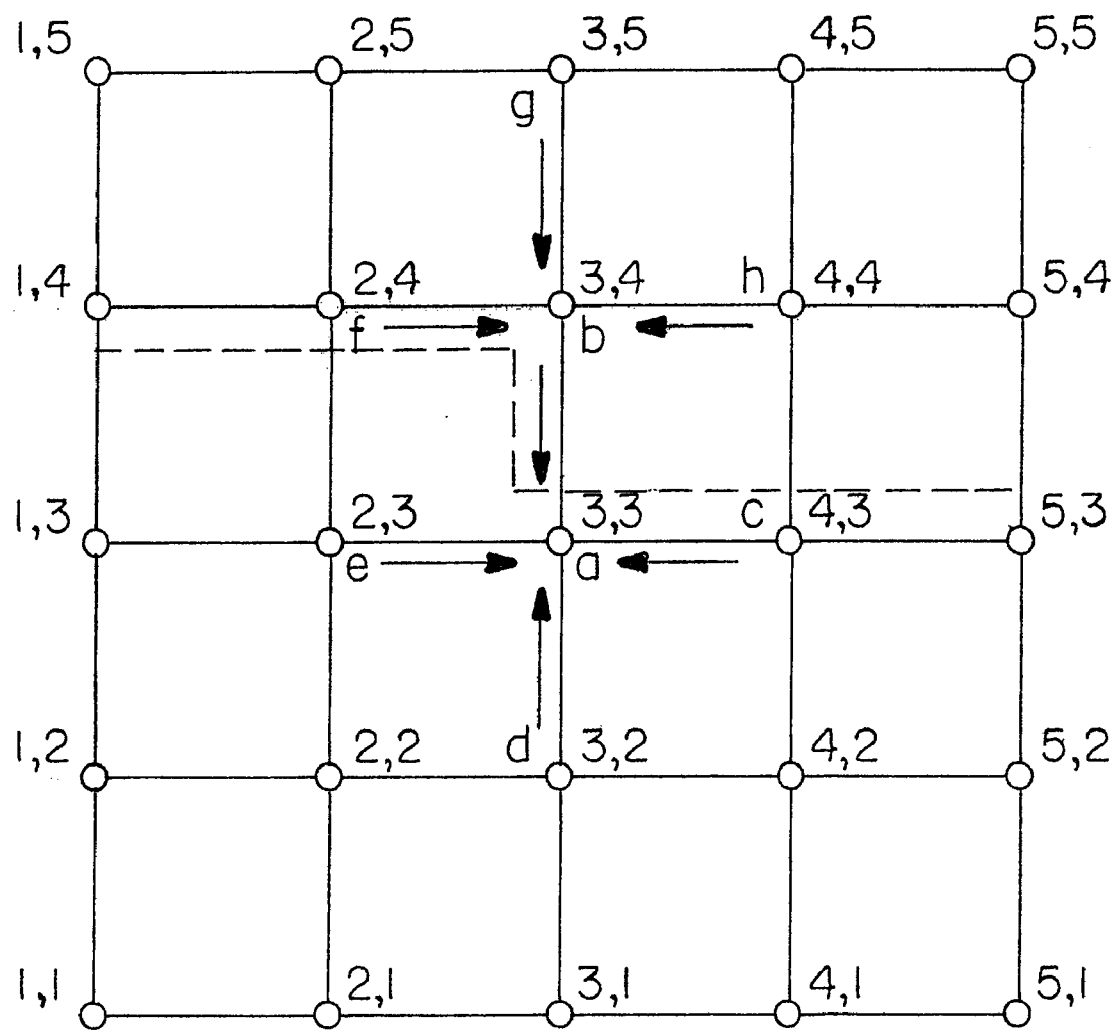
FIG. 6 illustrates tree saturation of a network.

Consider the situation illustrated in FIG. 6. A single node in a 2-dimensional mesh network, node (3,3) labeled a, is overloaded with arriving messages. As it is unable to accept messages off the channels at the rate they are arriving, all four input channels to the node (b,a), (c,a), (d,a), (e,a), become congested and are blocked. Traffic arriving at nodes b–e that must be forwarded across these blocked links cannot make progress and will back up along the edges into nodes b–e. For example, traffic into node b backs up along (f,b), (g,b), and (h,b). If the blockage persists, the channels into f–h and related nodes become blocked as well and so on. If the overload on node a persists, eventually most of the channels in the network will become blocked as a tree of saturation expands outward from node a.

The major problem with tree saturation is that it affects traffic that is not destined for node a. A packet from (1,4) to (5,3) for example may be routed along a path (dotted line) that includes (f,b) and (b,a) for example. Since these links are blocked, traffic from node (1,4) to node (5,3) is blocked even though neither of these nodes is overloaded.

The router of the present invention overcomes the bandwidth and scalability limitations of prior-art bus- and crossbar-based routers by using a multi-hop interconnection network, in particular a 3-dimensional torus network, as a router. With this arrangement, each router in the wide-area backbone network in effect contains a small in-cabinet network. To avoid confusion we will refer to the small network internal to each router as the switching fabric and the routers and links within this network as the fabric routers and fabric links.

Unlike multicomputer networks, the switching fabric network is non-blocking and provides stiff backpressure. These crossbar-like attributes are achieved by providing a separate virtual network for each destination node in the network.

Typical packets forwarded through the internet range from 50 bytes to 1.5 Kbytes. For transfer through the fabric network of the internet router of the present invention, the packets are divided into segments, or flits, each of 36 bytes. At least the header included in the first flit of a packet is modified for control of data transfer through the fabric of the router. In the preferred router, the data is transferred through the fabric in accordance with a wormhole routing protocol.

Each virtual network comprises a set of buffers. One or more buffers for each virtual network are provided on each node in the fabric. Each buffer is sized to hold at least one flow-control digit or flit of a message. The virtual networks all share the single set of physical channels between the nodes of the real fabric network. A fair arbitration policy is used to multiplex the use of the physical channels over the competing virtual networks. Each virtual network has a different set of buffers available for holding the flits of its messages.

For each pair of virtual networks A and B, the set of buffers assigned to A contains at least one buffer that is not assigned to B. Thus if network B is blocked, A is able to make progress by forwarding messages using this buffer that is not shared with B although it may be shared with some other virtual network.

One simple method for constructing virtual networks is to provide a separate flit buffer, a virtual channel, on each node for each virtual network and thus for each destination. For example, in a machine with N=512 nodes and hence 512 destinations, each node would contain 512 distinct flit buffers. Buffer i on each node is used only to hold flits of messages destined for node i. This assignment clearly satisfies the constraints above as each virtual network is associated with a singleton set of buffers on each node with no sharing of any buffers between virtual networks. If a single virtual network becomes congested, only its buffers are affected, and traffic continues on the other virtual networks without interference. An alternative dispersive approach is discussed below.

Figure 7:
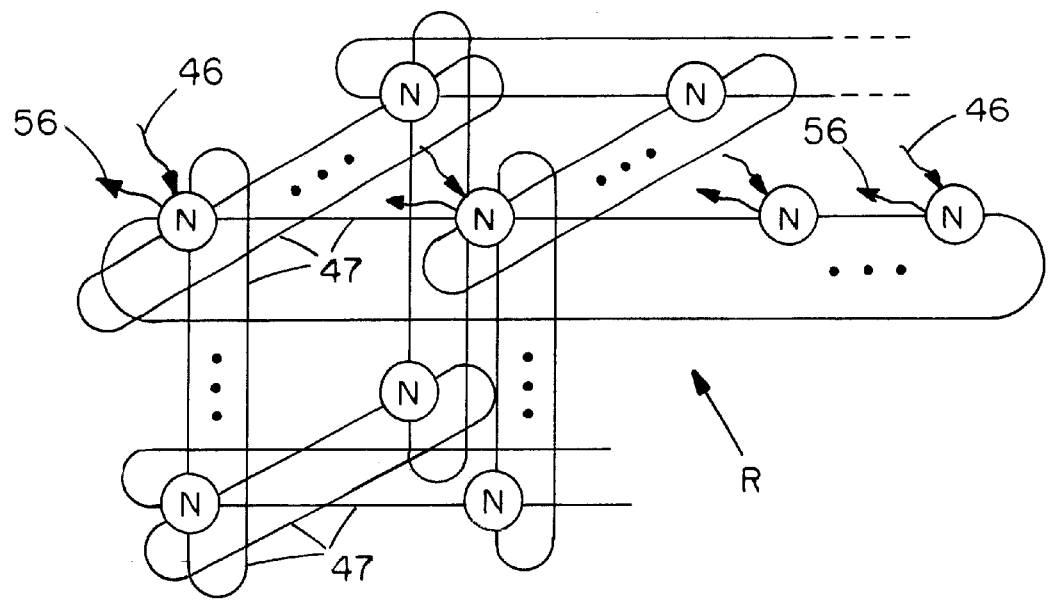
FIG. 7 illustrates a three-dimensional fabric embodying the present invention.

The preferred router R is a 3-dimensional torus network of nodes as illustrated in FIG. 7. Each node N comprises a line interface module that connects to incoming outgoing SONET internet links 46,56. Each of these line-interface nodes contains a switch-fabric router that includes fabric links 47 to its six neighboring nodes in the torus. IP packets that arrive over one SONET link 46, say on node A, are examined to determine the SONET link 56 on which they should leave the internet router, say node B, and are then forwarded from A to B via the 3-D torus switch fabric.

Figure 8:
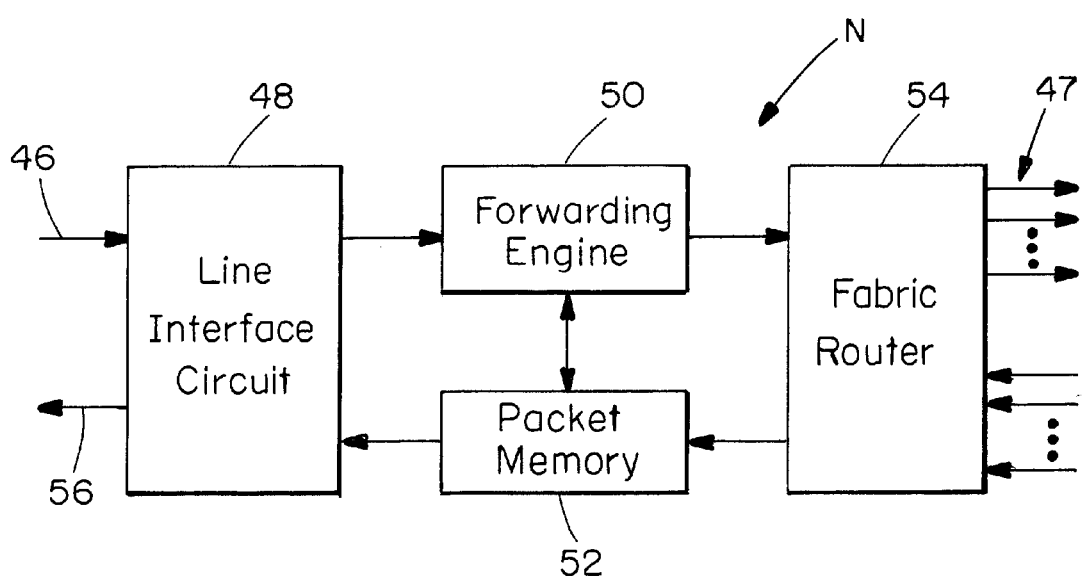
FIG. 8 illustrates the line interface module of a node in the array of FIG. 7.

The organization of each node or line-interface module is illustrated in FIG. 8. Packets arrive over the incoming SONET link 46, and the line interface circuit 48 converts the optical input to electrical signals and extracts the packets and their headers from the incoming stream. Arriving packets are then passed to the forwarding engine hardware 50 and are stored in the packet memory 52. The forwarding engine uses the header of each packet to look up the required output link for that packet. In conventional IP router fashion, this lookup is performed by traversing a tree indexed by the header fields. The leaves of the tree contain the required output link, as in a conventional IP router, and additionally include the route through the switch fabric to the output link. Finally, the packet along with its destination and route are passed to the fabric router 54 of the node for forwarding through the fabric to the output node. From the fabric router 54 of the output node, the packet is delivered through the packet buffer 52 of that node and through the line interface circuit 48 to the output link 56.

Packets in the internet router are forwarded from the line-interface module associated with the input trunk to the line-interface module associated with the output trunk using source routing. With source routing, the route of links 47 through intermediate fabric routers is determined by a table lookup in the input module. This lookup is performed by the forwarding engine before presenting the packet to the fabric router. Alternative paths allow for fault tolerance and load balancing.

The source route is a 10-element vector where each element is a 3-bit hop field. Each hop field encodes the output link to be taken by the packet for one step of its route, one of the six inter-node links 47 or the seventh link to the packet buffer of the present node. The eighth encoding is unused. This 10-element vector can be used to encode all routes of up to 10 hops which is sufficient to route between any pair of nodes in a 6×10×10 torus. Note that all 10 elements need not be used for shorter routes. The last used element selects the link to the packet buffer 52 or may be implied for a 10-hop route.

As the packet arrives at each fabric node along the route, the local forwarding vector entry for that packet is set equal to the leftmost element of the source route. The source route is then shifted left three bits to discard this element and to present the next element of the route to the next router. During this shift, the 3-bit code corresponding to the packet buffer of the present node is shifted in from the right. Subsequent flits in that packet follow the routing stored for that packet in the router.

Figure 9:
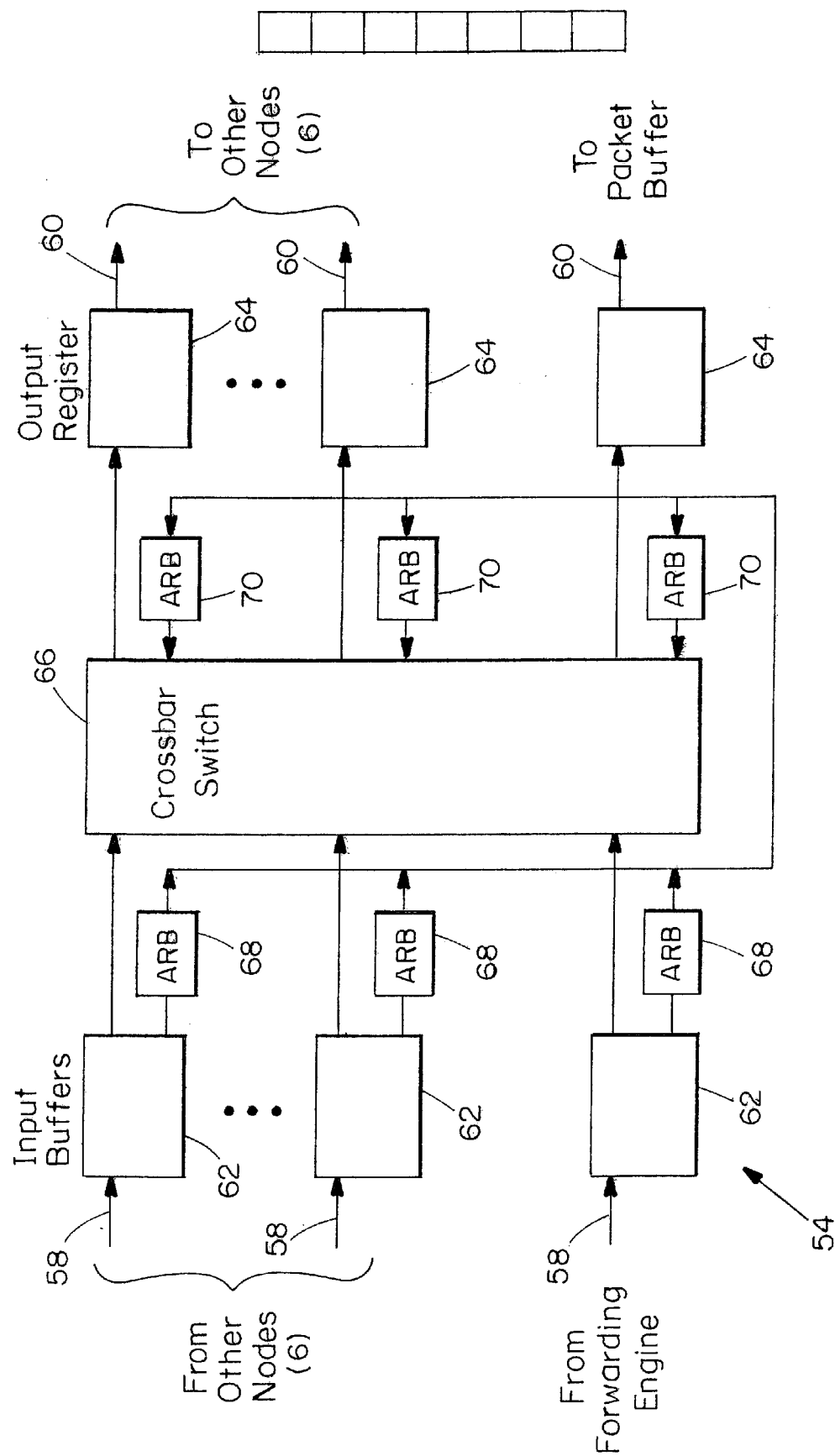
FIG. 9 illustrates a fabric router used in the embodiment of FIGS. 7 and 8.

A fabric router used to forward a packet over the switch fabric from the module associated with its input link to the module associated with its output link is illustrated in FIG. 9. The router has seven input links 50 and seven output links 60. Six of the links connect to adjacent nodes in the 3-D torus network of FIG. 7. The seventh input link accepts packets from the forwarding engine 50 and the seventh output link sends packets to the packet output buffer 52 in this router's line interface module. Each input link 58 is associated with an input buffer 62 and each output link 60 is associated with an output register 64. The input buffers and output registers are connected together by a 7×7 crossbar switch 66.

A virtual network is provided for each pair of output nodes. Each of the seven input buffers 62 contains a buffer, of for example one flit, for each virtual network in the machine. In one embodiment, a 6×10×10 torus fabric provides 600 nodes. A single virtual network is assigned to a pair of maximally distant output nodes in the network as minimal routes between these two nodes are guaranteed not to share any links and thus are guaranteed not to interfere with one another. Further, two virtual networks are provided for each pair of nodes to allow for two priorities in serving different classes of traffic. Thus, in the router, there are 600 virtual networks: two virtual networks for each of 300 pairs of nodes. Each input buffer 62 contains space for 600 36-byte flits (21,600 bytes total).

As an improvement, each input buffer has storage for two flits for each virtual channel. The size of a flit determines the maximum duty factor of a single virtual channel and the fragmentation loss associated with rounding up packets to a whole number of flits. The maximum bandwidth on a single fabric link that can be used by a single virtual channel can be no more than the flit size times the number of flits per virtual channel buffer divided by the time for a header flit to propagate through a router. For example, if a flit is 36 Bytes, there is a single flit per buffer, and it takes ten 10 ns clocks for a header flit to propagate through a router, the maximum bandwidth per virtual channel is 360 MBytes/s. If the link bandwidth is 1200 MBytes/s, a single virtual channel can use at most 30% of the link bandwidth. If the flit buffer capacity is at least as large as the link bandwidth divided by the router latency (120 Bytes in this case), a single virtual channel can use all of the link capacity.

One would like to make the flit size as large as possible both to maximize the link bandwidth that a single virtual channel can use and also to amortize the overhead of flit processing over a larger payload. On the other hand, a large flit reduces efficiency by causing internal fragmentation when small packets must be rounded up to a multiple of the flit size. For example, if the flit size is 64 Bytes, a 65 Byte packet must be rounded up to 128 Bytes, incurring nearly 50% fragmentation overhead.

One method for gaining the advantages of a large flit size without incurring the fragmentation overhead is to group adjacent flits into pairs that are handled as if they were a single double-sized flit. For all but the last flit of an odd-length message, all flit processing is done once for each flit pair, halving the flit processing overhead. The last odd flit is handled by itself. However, these odd single-flits are rare and so their increased processing overhead is averaged out. In effect, flit pairing is equivalent to having two sizes of flits—regular sized and double sized. The result is that long messages see the low processing overhead of double-sized flits and short messages see the low fragmentation overhead of regular sized flits. In the preferred embodiment, flits are 36 Bytes in length and are grouped into pairs of 72 Bytes total length.

If a virtual channel of a fabric router destined for an output node is free when the head flit of a packet arrives for that virtual channel, the channel is assigned to that packet for the duration of the packet, that is, until the worm passes. However, multiple packets may be received at a router for the same virtual channel through multiple inputs. If a virtual channel is already assigned, the new head flit must wait in its flit buffer. If the channel is not assigned, but two head flits for that channel arrive together, a fair arbitration must take place. With limited buffer space assigned to each virtual channel, a block at an output node from the fabric is promptly seen through backpressure to the input line interface for each packet on that virtual network. The input line interface can then take appropriate action to reroute subsequent packets. With assignment of different destinations to different virtual networks, interference between destinations is avoided. Traffic is isolated.

Once assigned an output virtual channel, a flit is not enabled for transfer across a link until a signal is received from the downstream node that an input buffer at that node is available for the virtual channel.

Figure 10A:
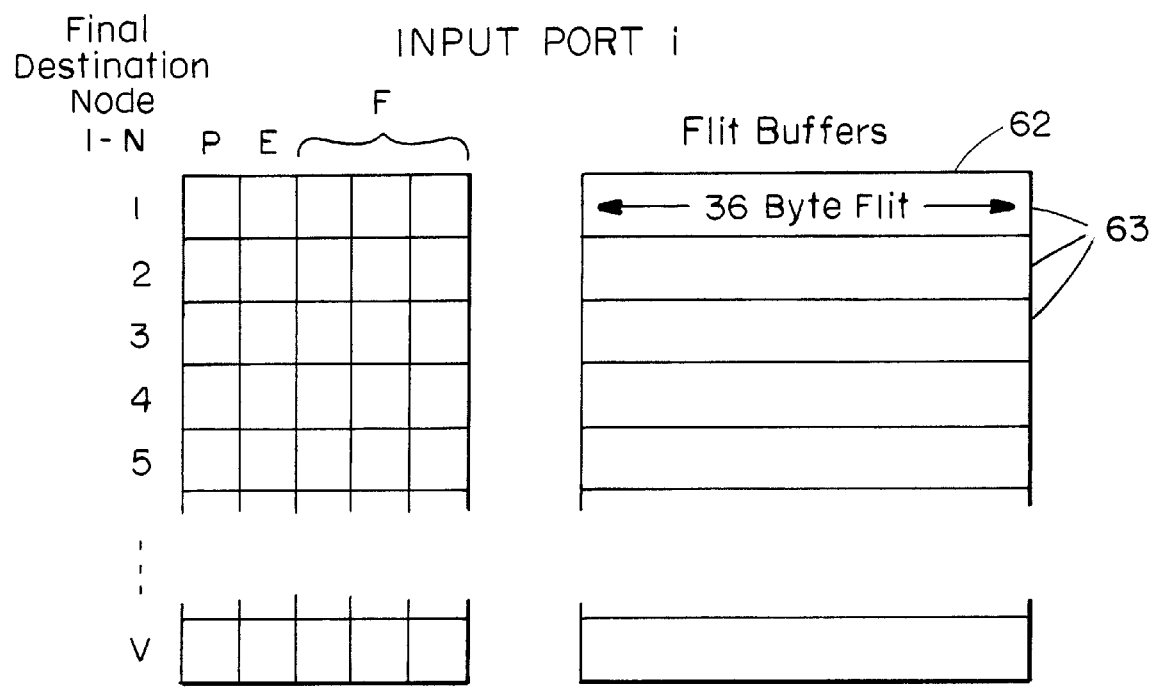
FIGS. 10A and 10B illustrates buffers, registers and control vectors used in the router of FIG. 9.
Figure 10B:
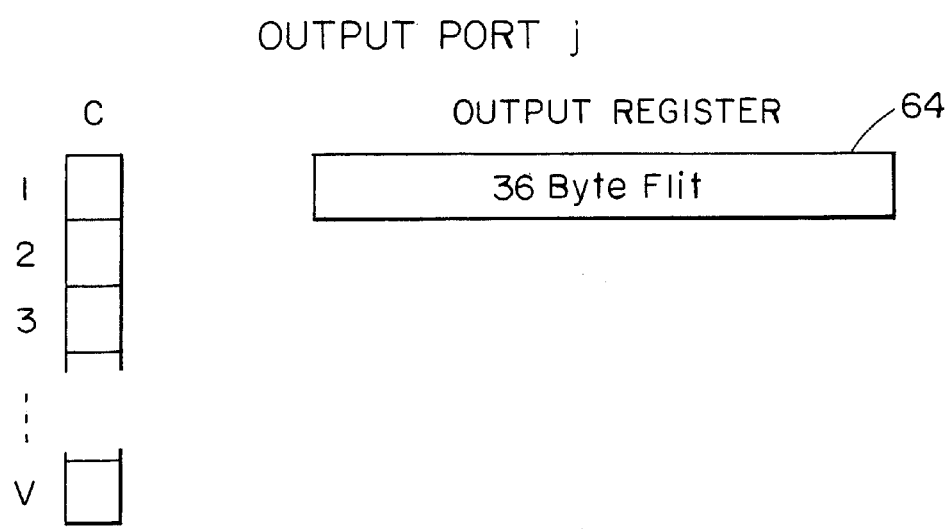

An elementary flow control process is illustrated in FIGS. 9, 10A and 10B. Each cycle, a number M of the enabled flits in each input buffer are selected by a fair arbitration process 60 to compete for access to their requested output links. The selected flits forward their output link requests to a second arbiter 70 associated with the requested output link. This arbiter selects at most one flit to be forwarded to each output link. The winning flits are then forwarded over the crossbar switch to the output register and then transmitted over the output link to the next router in the switch fabric. Until selected in this two-step arbitration process, flits remain in the input buffer, backpressure being applied upstream.

The fabric router at each line-interface module uses credit-based flow-control to regulate the flow of flits through the fabric network. Associated with each set of input buffers 62 are two V-bit vectors; a presence vector, P, and an enabled vector, E. V, as illustrated in FIG. 10A, is the number of virtual networks and hence the number of entries in the buffer. A bit of the presence vector, P[v,i], is set if the input buffer i contains a flit from virtual network v. Bit E[v,i] is set if this flit is enabled to take the next hop of the route to its destination link.

As illustrated in FIG. 10B, associated with each output register is a V-bit credit vector, C, that mirrors the complement of the presence vector on the opposite end of the fabric link at the receiving node. That is, C[v,j] is set at a given output j if P[v,i] is clear at the input port on the opposite side of the link. If C[v,j] is set, then the output register has a credit for the empty buffer at the opposite end of the link.

Flits in an input buffer are enabled to take their next hop when their requested output link has a credit for their virtual network. For example, suppose the packet in virtual network v of input buffer i has selected output link j for the next hop of its route. We denote this as F[v,i]=j, where F is the forwarding vector. The flit in this input buffer is enabled to take its next hop when two conditions are met. First, it must be present, P[v,i]=1, and second, there must be a credit for buffer space at the next hop, C[v,j]=1.

The input buffer storage is allocated separately to each virtual network while the output registers and associated physical channels are shared by the virtual networks. The credit-based flow control method guarantees that a virtual network that is blocked or congested will not indefinitely tie up the physical channels since only enabled flits can compete in the arbitration for output links. Further, because only one or two flits per virtual network are stored in each input buffer, stiff backpressure is applied from any blocked output node to the forwarding engine of the input node.

Allocation

Arbitration and flow control can be seen as an allocation problem which involves assigning virtual channels to packets, arriving from different input nodes and destined to common output nodes, and assigning physical channel bandwidth to flits destined to the same next node in the fabric path.

In a multistage switching fabric, packets composed of one or more flits advance from their source to their destination through one or more fabric routers. At each hop, the head flit of a message arrives at a node on an input virtual channel. It can advance no further until it is assigned an output virtual channel. In the switch fabric of the preferred embodiment each packet may route on only one virtual channel. If the virtual channel is free when the packet arrives, it is assigned to the arriving packet. If, however, the virtual channel is occupied when the packet arrives, the packet must wait until the output virtual channel becomes free. If one or more packets are waiting on a virtual channel when it is released, an arbitration is performed and the channel is assigned to one of the waiting packets.

Once a packet succeeds in acquiring the virtual channel it must compete for physical channel bandwidth to advance its flits to the next node of its route. A packet can only compete for bandwidth when two conditions hold. First, at least one flit of the packet must be present in the node. Second, there must be at least one flit of buffer space available on the next node. If these two conditions do not hold, there is either no flit to forward or no space in which to put the flit at the next hop. If both conditions hold for a given packet, then that packet is enabled to transmit a flit. However, before a flit can be sent, the packet must win two arbitrations. Among all the enabled packets, for a flit of the packet to advance to the next node of the route, a packet must be granted both an output port from the input flit buffer and the output physical channel.

For small numbers of virtual channels, the allocation problem can be solved in parallel for the elementary case of FIGS. 9, 10a and 10B using combinational logic.

Consider first the virtual channel allocation problem. A bit of state, H, is associated with each of V input virtual channels on each of K input controllers. This bit is set if the input virtual channel contains a head flit that has not yet been assigned an output virtual channel. The bit array H[1:V,1:K] determines the demand for virtual channels. A bit of state, B, is associated with each of V output virtual channels in each of K output controllers. This bit is set if the output virtual channel is busy. The bit array B[1:V,1:K] determines the allocation status of the virtual channels.

To allocate a virtual channel, v, in output controller, k, an arbitration must first be performed across virtual channel v in each of the k input controllers with input controller i only competing if (1) H[v,i] is set and (2) the destination of the channel, F[v,i]=k. The input that wins the arbitration is granted the virtual channel only if B[v,k]=0.

The situation is similar for allocation of physical channel bandwidth to flits. The buffer status of each input virtual channel is indicated by a presence bit, P, that is set when one or more flits are in the present node. Each output virtual channel looks ahead and keeps a credit bit, C, that is set when one or more empty buffers are available in the next node. Suppose we choose to do the allocation serially (which is sub-optimal); first arbitrating for an output port of the input controller and then arbitrating for an output channel. Suppose each input buffer has M output ports. Then for input buffer i, we first determine which virtual channels are enabled. An enabled vector, E[v,i] is calculated as E[v,i]=¬H[v,i]∧P[v,i]∧c[c,j] where ¬denotes logical negations, ∧ denotes a logical AND operation, and j is the destination of the packet on virtual channel v of input controller i. Thus, a packet is enabled to forward a flit when it is not waiting for a virtual channel, when there is at least one flit present in its buffer, and when there is at least one flit of storage available at the next hop. Next, all of the enabled channels in the input buffer arbitrate for the M output ports of the input buffer. This requires a V-input M-output arbiter. Finally, the winners of each local arbitration arbitrate for the output virtual channels, this takes K, MK-input arbiters.

With large numbers of virtual channels a combinational realization of the allocation logic requires a prohibitive number of gates. The preferred switch fabric has V=600 virtual channels and K=7 ports. To implement this allocation method having combinational logic thus requires 4200 elements of vectors H and B, 4200 3:8 decoders to qualify the arbitrations, and 4200 7-input arbiters to select the winners. Between the flip-flops to hold the state, the decoders, and the arbiters, about 50 2-input gates are required for each of the 4200 virtual channels for a total of over 200,000 logic gates, a prohibitive number.

For the preferred router, the P and C arrays are also 4200 elements each. Between the C-multiplexers and the arbiters, each element requires about 40 gates. Thus the bandwidth allocation requires an additional 160,000 logic gates.

While quite reasonable for routers with small numbers of virtual channels, V less than or equal to 8, combinational allocation is clearly not feasible for the router with V=600.

Event-Driven Allocation

The logic required to perform allocation can be greatly reduced by observing that for large numbers of virtual channels, the state of most virtual channels is unchanged from one cycle to the next. During a given flit interval, at most one virtual channel of a given input controller can have a flit arrive, and at most M virtual channels can have a flit depart. The remaining V−M−1 virtual channels are unchanged.

The sparse nature of changes to the virtual channel state can be exploited to advantage through the use of event-driven allocation logic. With this approach, a single copy (or a small number of copies) of the virtual channel state update, and allocation logic is multiplexed across a large number of virtual channels. Only active virtual channels, as identified by the occurrence of events, have their state examined and updated and participate in arbitration.

Two types of events, arrival events and credit events, activate the virtual channel state update logic. A third type of event, a transport event, determines which virtual channels participate in arbitration for physical channel bandwidth. Each time a flit arrives at a node, an arrival event is queued to check the state of the virtual channel associated with that flit. A similar check is made in response to a credit event which is enqueued each time the downstream buffer state of a virtual channel is changed. Examining the state of a virtual channel may lead to allocation of the channel to a packet and/or scheduling a flit for transport to the downstream node. In the latter case, a transport event is generated and enqueued. Only virtual channels with pending transport events participate in the arbitration for input buffer output ports and output physical channels. Once a flit wins both arbitrations and is in fact transported, the corresponding transport event is dequeued.

Figure 11A:
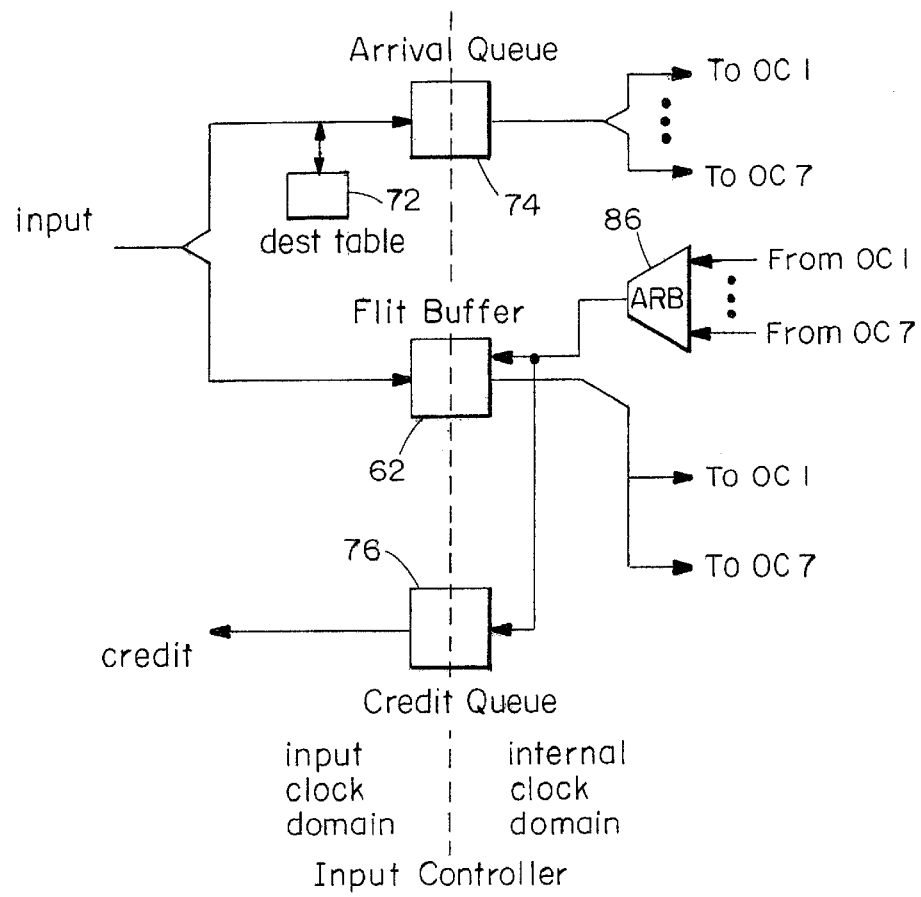
FIGS. 11A and 11B illustrate alternative allocation control logic provided in input and output controllers, respectively, of the router of FIG. 9.
Figure 11B:
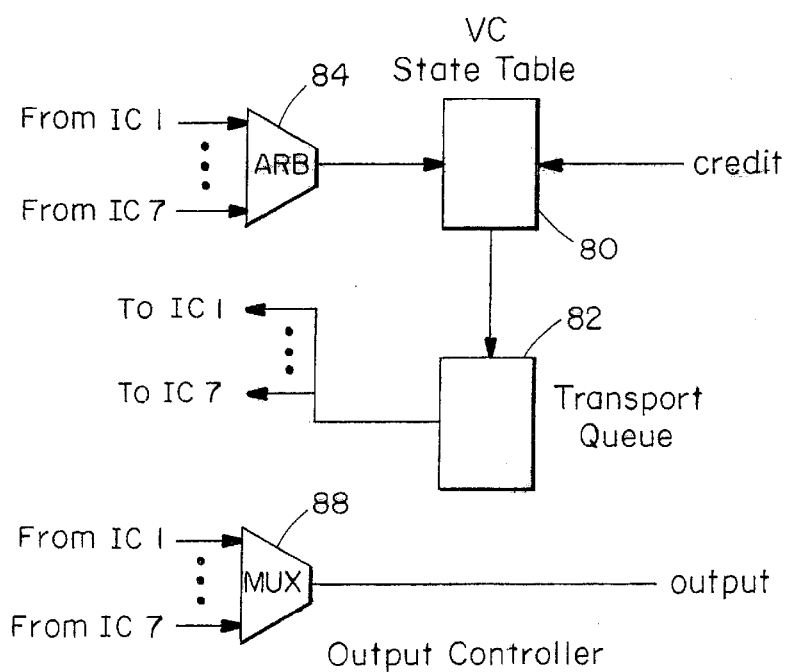

Logic to implement event-driven channel allocation is illustrated in FIGS. 11A and 11B. FIG. 11A shows one of seven input controllers while FIG. 11B shows one of seven output controllers. Each input controller is connected to each output controller at the three points shown. Each input controller includes a destination table 72, an arrival queue 74, a credit queue 76 and a flit buffer 78. A virtual channel state table 80 and a transport queue 82 are included in each output controller. The Figures show an event-driven arrangement where the virtual channel state is associated with each output controller. It is also possible to associate the state with the input controllers. Placing the state table in the output controller has the advantage that virtual channel allocation (which must be performed at the output controller) and bandwidth allocation (which can be performed at either end) can be performed using the same mechanism.

The destination tables, flit buffers, and virtual-channel state tables have entries for each virtual channel, while the three queues require only a small number of entries. For each virtual channel, the destination table records the output port required by the current packet on that input channel, if any, (i.e., $F_a$) the flit buffer 62 provides storage for one or more flits of the packet, and the state of the output virtual channel is recorded in the state table. The arrival, credit, and transport queues contain entries for each event that has occurred but has not yet been processed.

On the input side, the dual-ported arrival queue, credit queue, and flit buffer also serve as a synchronization point as illustrated by the dashed line in FIG. 11A. The left port of these three structures, and all logic to the left of the dotted line (including the destination table), operates in the clock domain of the input channel. The right port of these three structures, and all logic to the right of the dotted line, including FIG. 11B, operate in the internal clock domain of the router.

With the arrangement shown in FIGS. 11A and 11B, an allocation of a virtual channel or a physical channel flit cycle is performed through a three-event sequence of arrival, transport, and credit. An arriving flit arbitrates for access to the state table for its output virtual channel. When granted, the table is updated to account for the arriving flit and, if the channel is allocated to its input controller and a credit is available, a transport request is queued to move the flit. The transport request arbitrates for access to the input flit buffer. When access is granted the flit is removed from the buffer and forwarded to the next node. Whenever a flit is removed from the flit buffer a credit is queued to be transmitted to the previous node. When credits arrive at a node, they update the virtual channel state table and enable any flits that are waiting on zero credits. Finally, the arrival of a tail flit at a node updates the virtual channel state to free the channel.

Each time a flit arrives at an input controller, the contents of the flit are stored in the flit buffer 62. At the same time, the destination table 72 is accessed, and an arrival event, tagged with the required output port number, is enqueued at 74. The destination table is updated by the head flit of each packet to record the packet's output port and then consulted by the remaining flits of a packet to retrieve the stored port number. An arrival event includes a virtual channel identifier (10 bits), a head bit, and an output port identifier (3 bits). The arrival events at the heads of each of the K input controller's arrival queues (along with input port identifiers (3 bits)) are distributed to arbiters 84 at each output controller. At each output controller the arrival events that require that output port arbitrate for access to the state table 80. Each cycle, the winning arrival events are dequeued and processed. The losing events remain queued and compete again for access to the state table on the subsequent cycle.

For each output virtual channel, v, on output k, the virtual channel state table 80 maintains a state vector, s[v,k] containing:

1. The allocation status of the channel, B, idle (0), busy (1) or tail pending (2).
2. The input controller assigned to this channel (if B is set), I, (3 bits).
3. A bit vector of input controllers waiting on this channel, W, (7 bits).
4. The number of credits (empty buffers on the next node), C, (1 bit).
5. The number of flits present on this node, P, (1 bit).

The first three of these (B,I,W) are associated with the allocation of output virtual channels to input virtual channels while the last two (C,P) are associated with the allocation of physical channel bandwidth to flits. The number of flits in each element of the state vector may be varied as appropriate. For example, if more flit buffers are available on each node, then more bits would be allocated to the C and P field. Much of the state here corresponds directly to the state bits in the combinational logic approach. The B, C, and P bits are identical. The W bits correspond to the H bits, qualified by required output channel.

The number of bits in the waiting vector, W, can be increased to provide improved fairness of arbitration. With just a single bit, a random or round-robin arbitration can be performed. If 3-bits are stored for each entry, a queuing arbitration can be performed with the input virtual channels serviced in the order that their requests arrived. Each virtual channel in effect "takes a number" when it arrives at the state table, and this number is stored in its entry of the W vector. When the channel becomes free, the "next" number is served.

When an arrival event associated with virtual channel v, from input controller I, arrives at the state table for output k, it reads S[v,k] and performs one of the following actions depending on the type of event (heads vs. body) and the state of the channel.

1. If the flit is a head, the channel is idle, B=0, and there are downstream credits, C≈0, (a) the channel is assigned to the input by setting B=1, 1=i, (b) a downstream buffer is allocated by decrementing C, and (c) a transport request is queued for (v,i,k) at 82.
2. If the flit is a head, the channel is idle, but there are no downstream credits, the channel is assigned to the input, and the presence count, P, is incremented. No downstream buffer is allocated and no transport request is queued.
3. If the flit is a head and the channel is busy, B=1, the virtual channel request is queued by setting the ith bit of the wait vector, W.
4. If the flit is a body flit, and there are downstream credits, a downstream buffer is allocated and a transport request is queued.
5. If the flit is a body flit, and there are no downstream credits, the presence count is incremented.
6. If the flit is a tail and W=0, no waiting heads, then, if there is a credit available the tail flit is queued for transport and the channel is marked idle, B=0. Otherwise, if no credit is available, the channel is marked tail pending, B=2, so the arrival of a credit will transmit the tail and free the channel.
7. If the flit is a tail, a credit is available (C≈0), and there are packets waiting (W≈0), the tail flit is queued for transport as in cases 1 and 4 above. An arbitration is performed to select one of the waiting inputs, j. The channel is assigned to that input (B=1, I=j), and, if there is an additional credit available, this new head flit is queued for transport; otherwise it is marked present.
8. If the flit is a tail and a credit is not available, (C=0), the presence count is incremented and the status of the channel is marked "tail pending," (B=2).

If there is just a single flit buffer per virtual channel, when a body flit arrives there is no need to check the virtual channel allocation status (B, I and W) as the flit could only arrive if the channel were already allocated to its packet (B=1, I=i). If there is more than one flit buffer per virtual channel, the virtual channel of each body flit arrival must be checked. Flits arriving for channels that are waiting for an output virtual channel will generate events that must be ignored. Also, the number of flits buffered in a waiting virtual channel must be communicated to the state table 80 when the output channel is allocated to the waiting channel. This can be accomplished, for example, by updating the flit count in the state table from the count in the flit buffer whenever a head flit is transported. Note that in case 1 above, we both allocate the virtual channel and allocate the channel bandwidth for the head flit in a single operation on the state table. Tail flits here result in a pair of actions: the tail flit is first processed as a body flit to allocate the bandwidth to move the tail flit, the tail flit is then processed as a tail flit to free the channel and possibly move a pending head flit. Unless the transport queue can accept two inputs simultaneously, this must be done sequentially as a tail flit arrival may enqueue two flits for transport: the tail flit itself, and the head flit of a waiting packet.

Each entry in the transport queue (v,i,k) is a request to move the contents of flit buffer v on input controller i to output k. Before the request can be honored, it must first arbitrate at 86 for access to flit buffer i. On each cycle, the transport requests at the head of the queues in each of the K output controllers are presented to their requested input buffers where they arbitrate for access to the M ports. The winning transport requests are dequeued and their flits forwarded to the appropriate output multiplexer 88. The other requests remain in the transport queues. There is no need to arbitrate for a fabric link here, as the output controller associated with each of the outgoing fabric links makes at most one request per cycle.

Each time a transport request successfully forwards a flit to an output, a credit is generated to reflect the space vacated in the input flit buffer. This credit is enqueued in a credit queue 76 for transmission to the output controller of the previous node. When a credit for virtual channel v arrives at output controller k of a node, it reads the state vector, S[v,k], to check if any flits are waiting on credits. It proceeds as follows depending on the state of the presence count.
1. If there are no flits waiting, P=0, the credit count is incremented, C=C+1.
2. If there are flits waiting, P≈0, the number of waiting flits is decremented, P=P−1, and a transport request for the first waiting flit is enqueued.
3. If there is a tail flit pending (B=2), a transport request for the tail flit is queued. If no head flits are waiting on the channel (W=0), the channel is set idle (B=0). Otherwise, if there are head flits waiting (W≈0), an arbitration is performed to select a waiting channel, say from input controller j, the channel is allocated to this channel (B=1, I=j), and the head flit is marked present (P=1) so the next arriving credit will cause the head flit to be transmitted.

The event-driven method of allocation described here reduces the size and complexity of the logic required for allocation in two ways. First, the state information for the virtual channels can be stored in a RAM array with over 10× the density of the flip-flop storage required by the combinational logic approach. Second, the selection and arbitration logic is reduced by a factor of V. Arbitration for access to the virtual channel buffers is only performed on the channels for which changes have occurred (flit or credit arrival), rather than on all V channels.

Only the flit buffer, the state table, and the destination table in FIGS. 11A and 11B need to have V entries. A modest number of entries in the bid, transport, and credit queues will suffice to smooth out the speed mismatches between the various components of the system. If a queue fills, operation of the unit filling the queue is simply suspended until an entry is removed from the queue. Deadlock can be avoided by breaking the cycle between event queues. For example, by dropping transport events when the transport queue fills, the state table is able to continue to consume credit and arrival events. Lost events can be regenerated by periodically scanning the state table. Alternately, one of the N queues, e.g., the transport queue, can be made large enough to handle all possible simultaneous events, usually V times N (where N is the number of flits in each channel's input buffer).

Dispersion

While assigning a separate virtual channel to each virtual network is a simple solution, it is costly and has limited scalability. The number of buffers required in each interconnection network router increases linearly with the number of nodes in the system. With 512 virtual networks the number of flit buffers required is pushing the physical limits of what can be economically constructed on the integrated circuits making up the router's switch fabric.

To reduce the number of buffers, and hence the cost, of the switch fabric and to provide for greater scalability, virtual networks may be constructed with overlapping buffer assignments by using dispersion codes. Consider for example a network with N nodes (and hence N virtual networks) and V virtual channels (flit buffers) on each node. Each node, j, is assigned a dispersion code, a V-bit vector that specifies which of the V virtual channels this virtual network is permitted to use. That is, the vector contains a 1 in each bit position that corresponds to a permitted virtual channel and 0s in all other positions. The dispersion codes must be assigned so that for every pair of virtual networks, A and B, the bit vector corresponding to A contains a 1 in a position at which the bit vector corresponding to B contains a zero.

Care must be taken in assigning dispersion codes to avoid channel-dependence deadlocks between virtual networks. An assignment of dispersion codes for a 3-D torus network that is guaranteed to be deadlock-free may be made as follows:

Consider a 1-D bidirectional ring network. Associated with each destination is a virtual network (VN) that is permitted to use C virtual channels with a maximum overlap of S virtual channels between any pair of VNs.

Figure 12:
FIG. 12 illustrates a loop used to demonstrate dispersion routing.

In each direction around the loop, the span of a virtual network is the set of channels used by the virtual network. With minimal routing, the span of each VN covers half of the channels in the cycle. In FIG. 12, for example, the span of the VN rooted at the shaded node in the clockwise direction consists of the three heavily shaded channels. Its span in the other direction consists of the channels that run in the opposite direction to the three lightly shaded channels.

In networks having a radix, k, of 5 or more, and unrestricted assignment of virtual channels, a dependent-cycle of three VNs with overlapping spans on the ring can cause deadlock. With dispersion routing, 3N VNs (where N=floor (C/S)) are required to generate a deadlocked configuration as a packet must block on N separate blocked VNs to deadlock.

A sufficient condition to avoid deadlock is for each VN to have at least one VC that it shares only with VNs that overlap either entirely or not at all. With this approach, each VC is always able to make progress (within one dimension). It is possible to avoid deadlock with a less restrictive assignment of VCs to VNs since it is only necessary to break the deadlock at one point in the cycle.

In a multidimension network it is possible to deadlock even if all dimensions are individually deadlock free. Consider the two-dimensional case which is easily extended to three dimensions. A deadlock can form if a packet making a NW turn blocks on a packet making a WS turn which in turn blocks on a packet making a SE turn, which in turn blocks on a packet making an EN turn, which in turn blocks on the original packet. This forms a cycle (NW,WS,SE,EN); C. J. Glass and L. M. Ni, "The Turn Model for Adaptive Routing," Proceedings of the 19th International Symposium on Computer Architecture, May 1992, pp. 278–287.

If minimal routing is used, each VN is itself deadlock-free as in each quadrant about the destination node, only two directions, and hence only two (of eight possible) turns, are used. In the region NE of the destination node, for example, packets only travel S and W and hence only SW and WS turns are allowed. This is one turn from the clockwise cycle and one turn from the counterclockwise cycle. If VNs share VCs, however, deadlock can occur as the turns missing from one VN may be present in other VNs sharing the same VCs.

A sufficient method for preventing inter-dimension deadlock is to (1) make the dimensions individually deadlock free and (2) to require that each VN (a) disallow one of the four turns in both the CW and CCW directions, and (b) have at least one VC that is shared only with VNs disallowing the same turn. This is quite restrictive as it forces two of the four quadrants about the destination node to route in dimension order.

A strategy that permits more flexible routing, but a more costly one in terms of VCs, is to associate two VNs with each destination node, one for all quadrants but the NW that disallows the SE and WS turns and one for all quadrants but the SE that disallows the NW and WN turns. VNs from each class can then share VCs without restriction as long as they remain deadlock free in each dimension independently.

One workable method for assigning VCs in two dimensions is as follows:

1. Each destination is assigned a VC pair (one VC that disallows SE/WS and one that disallows NW/WN) associated with its x-coordinate (mod $k_x/2$), where $k_x$ is the number of nodes in the x-dimension. Assigning this VC pair guarantees non-overlap and hence single-dimension deadlock freedom in the x-dimension.
2. Each destination is assigned a VC pair associated with its y-coordinate (mod $k_y/2$). This guarantees single-dimension deadlock freedom in the y-dimension.
3. Any additional VC pairs are assigned arbitrarily subject to the restriction that no more than S VCs are shared between any two destinations.
4. The routing tables are built so that nodes in the NW quadrant of a destination are restricted to the VN containing the VCs that disallow NW/WN and nodes in the SE quadrant are restricted to the other VN. Nodes in the NE and SW quadrants may use either VN.

As an example, for a 2-D network of 64-nodes (8×8) this assignment requires a minimum of 8VC pairs (16VCs).

To extend this approach to three dimensions we need to exclude additional turns to avoid 3-D inter-dimension cycles. However, we can accomplish this with just two VNs per destination as above. One VN excludes the turns associated with the NWU (North, West, Up) octant (SE,ES,SD, DS,ED,DE) while the other excludes the turns associated with the SED (South,East,Down) octant.

An example 1024-node network organized as 8×8×16 needs a minimum of 16VC pairs (32VCs) to assign one VC pair to each symmetric pair of planes in the network.

When a single destination receives an excessive amount of traffic, all VCs associated with its two VNs will quickly saturate and back up to the source. To first approximation it is as if these VCs were removed from the network. With the channel assignment suggested above, where each destination node has two VNs with three VCs each, this leaves four VCs to route on.

Deflection Routing

Deflection routing is another method for making traffic destined for different fabric outputs substantially non-blocking. With deflection routing all of the packets are allowed to share virtual channels without restriction. When a packet blocks, however, rather than waiting for the required virtual channel to become available, it is misrouted or "deflected" to the packet memory of the present fabric router's line interface. It is reinjected into the fabric at a later time. Because a packet destined for fabric output A is never allowed to block, it cannot indefinitely delay a packet destined for fabric output B.

Deflection routing has several properties that make it less desirable than using virtual networks to achieve isolation between packets destined for different outputs. First, deflection routing provides no backpressure. When an output becomes congested, packets destined for that output are simply deflected and the fabric inputs sending packets to the congested output remain unaware of any problem. Second, while there is no blocking, there is significant interference between packets destined for different outputs. If an output, A, is congested, the links adjacent to A will be heavily utilized and a packet destined for output B that traverses one of these links will have a very high probability of being deflected. Third, the use of deflection routing greatly increases the bandwidth requirements of the packet memory as this memory must have sufficient bandwidth to handle deflected packets and their reinjection in addition to their normal input and output. Finally, deflection routing is limited by the finite size of the packet memory on each line interface. Under very high congestion, as often occurs in IP routers, the packet memory may be completely filled with deflected packets. When this occurs, packets must be dropped to avoid interference and possibly deadlock.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. An internet router for coupling to a plurality of internet links, the router receiving data packets from the internet links, analyzing header information in the data packets at inputs to the router to determine output internet links from said router, and forwarding the data packets on the output internet links, the improvement wherein the router comprises a fabric of fabric links joined by fabric routers, the number of fabric links to each fabric router being substantially less than the number of internet links served by the internet router, the fabric links and routers providing data communication between internet links through plural hops through the fabric using a routing protocol other than the internet protocol by which information associated with each packet is used at each fabric router to determine the next hop in the fabric; between hops on fabric links, segments of packets being stored in fabric routers at storage locations assigned to virtual channels corresponding to destination internet links, the virtual channels and fabric links forming virtual networks corresponding to the destination internet links.

2. An internet router as claimed in claim 1 wherein a line interface to each internet link analyzes the header information in data packets received from the internet link to identify an output internet link through an internet routing protocol and to determine through a fabric routing protocol a routing path through the fabric to the identified output internet link.

3. An internet router as claimed in claim 2 wherein packets are subdivided into segments at the line interface and forwarded through the fabric through wormhole routing.

4. An internal router as claimed in claim 3 wherein the segments are flits.

5. An internet router as claimed in claim 2 wherein the link interface defines the routing path through the fabric by including, in a header, a link definition of each successive link in the routing path, each fabric router along the routing path storing an associated link definition from the header for forwarding successive segments of the packet.

6. An internet router as claimed in claim 1 wherein the set of internet links is partitioned into disjoint subsets and each virtual channel is assigned exclusively to one subset of destination interact links.

7. An internet route as claimed in claim 6 wherein each subset is a pair of destination internet links at opposite ends of the fabric.

8. An internet router as claimed in claim 1 wherein the number of internet links served by the internet router is at least an order of magnitude greater than the number of fabric links to each fabric router, and wherein the number of virtual channels per fabric router is substantially greater than the number of links to the fabric router.

9. An internet router as claimed in claim 1 wherein an arbitration is performed at each fabric router to assign a packet to a virtual channel for output from the fabric router and to assign a virtual channel to an output fabric link from the fabric router.

10. An internet router as claimed claim 9 wherein a virtual channel is enabled for possible assignment to an output fabric link upon receipt of an indication that an input buffer is available at the opposite end of the fabric link.

11. An internet router as claimed in claim 1 wherein each fabric router comprises a crossbar switch.

12. An internet router as claimed in claim 11 wherein each fabric router comprises input buffers for receiving data packets from respective fabric routers and an internet link.

13. An internet router as claimed in claim 12 wherein each fabric router comprises an output controller for forwarding data along an output fabric link upon receipt of an indication that an input buffer is available at the opposite end of the fabric link.

14. An internet router as claimed in claim 1 wherein the fabric is a direct network.

15. An internet router as claimed claim 14 wherein the direct network is connected as a torus.

16. An internet router as claimed in claim 15 wherein the torus is a three-dimensional torus.

17. An internet router as claimed in claim 1 wherein the fabric is a three-dimensional torus network.

18. An internet router as claimed in claim 1 wherein the internet links are trunk lines.

19. An internet router for coupling to a plurality of internet links, the router receiving data packets from the internet links, analyzing header information in the data packets at inputs to the router to determine output internet links from said router, and forwarding the data packets on the output internet links, the improvement wherein the router comprises a fabric of fabric links joined by fabric routers, the number of fabric links to each fabric router being substantially less than the number of internet links served by the internet router, the fabric links and routers providing data communication between internet links through plural hops through the fabric using a routing protocol other than the internet protocol by which information associated with each packet is used at each fabric router to determine the next hop in the fabric, each fabric router comprising a plurality of buffers for defining virtual channels which share fabric links, each virtual channel associated with a set of network outputs, the virtual channels associated with a network output and fabric links forming virtual networks between internet router inputs and outputs in which congestion in one virtual network is substantially nonblocking to packets flowing through other virtual networks.

20. A method of routing data packets between internet links comprising:

analyzing header information in the data packets at inputs to the router to determine output internet links from said router; and routing the data packets through a multihop fabric network of fabric routers to the output internet links using a routing protocol other than the internet protocol by which information associated with each packet is used at each fabric router to determine the next hop in the fabric; between hops on fabric links, segments being stored in fabric routers at storage locations assigned to virtual channels corresponding to destination internet links, the virtual channels and fabric links forming virtual networks corresponding to the destination internet links.

21. A method as claimed in claim 20 further comprising analyzing the header information in data packets at a line interface to identify an output internet link through an internet routing protocol and to determine through a fabric routing protocol a routing path through the fabric network to the identified output internet link.

22. A method as claimed in claim 21 wherein the packets are subdivided into segments at the line interface and forwarded through the fabric through wormhole routing.

23. A method as claimed in claim 21 wherein the link interface defines the routing path through the fabric by including, in a header, a link definition of each successive link in the routing path, each fabric router along the routing paths storing a link definition from the header for forwarding successive segments of the packet.

24. A method as claimed in claim 20 wherein the set of destination internet links is partitioned into disjoint subsets and each virtual channel is assigned exclusively to one subset of destination internet links.

25. A method as claimed in claim 24 wherein each subset is a pair of destination internet links at opposite ends of the fabric.

26. A method as claimed in claim 20 wherein an arbitration is performed at each fabric router to assign a packet to a virtual channel for output from the fabric and to assign a virtual channel to an output fabric link from the fabric router.

27. A method as claimed in claim 26 wherein a virtual channel is enabled for possible assignment to an output fabric link upon receipt of an indication that an input buffer is available at the opposite end of the fabric link.

28. A method as claimed in claim 20 wherein the data packets are routed between fabric links through a crossbar switch.

29. A method as claimed in claim 20 wherein the data packets are routed between internet links through a three-dimensional torus direct network.

30. A method of routing data packets between internet links comprising:

analyzing header information in the data packets at inputs to the router to determine output internet links from said router; and routing the data packets through a multihop fabric network of fabric routers to the output internet links using a routing protocol other than the internet protocol by which information associated with each packet is used at each fabric router to determine the next hop in the fabric, each fabric router comprising a plurality of buffers for defining virtual channels which share fabric links, each associated with a set of network outputs, the virtual channels associated with a network output and fabric links forming virtual networks between internet router inputs and outputs in which congestion in one virtual networks is substantially nonblocking to packets flowing through other virtual networks.

31. A network comprising a plurality of fabric routers connected by fabric links, each fabric router comprising a plurality of buffers for defining virtual channels which share fabric links, each virtual channel associated with a set of network outputs, the virtual channels associated with a network output and fabric links forming virtual networks between network inputs and outputs, where each virtual network is associated with the set of network outputs and each virtual channel buffer carries traffic to only one network output, congestion in one virtual network being substantially nonblocking to packets flowing through other virtual networks.

32. A network as claimed in claim 31 wherein, between hops on fabric links, segments are stored in fabric routers at storage locations assigned to virtual channels corresponding to networks outputs.

33. A network as claimed in claim 32 wherein each virtual channel is assigned exclusively to a set of destination outputs.

34. A network as claimed in claim 33 wherein each set is a pair of destination internet links on opposite ends of the fabric.

* * * * *

UNITED STATES PATENT AND TRADEMARK OFFICE
CERTIFICATE OF CORRECTION

PATENT NO.     : 6,370,145 B1
DATED          : April 9, 2002
INVENTOR(S)    : William J. Dally, Phillip P. Carvey, Larry R. Dennison and P. Allen King It is certified that error appears in the above-identified patent and that said Letters Patent is hereby corrected as shown below:

Column 17,
Line 51, delete "interact link" and insert -- internet link --.

Column 20,
Line 10, delete "networks" and insert -- network --.
Line 27, delete "networks" and insert -- network --.

Signed and Sealed this

Eleventh Day of June, 2002

*Attest:*

*Attesting Officer*

JAMES E. ROGAN
*Director of the United States Patent and Trademark Office*